United States Patent

Bertaud et al.

Patent Number: 5,340,447
Date of Patent: Aug. 23, 1994

[54] PROCESS FOR THE SELECTIVE ELECTROFLUORINATION OF ALLOYS OR METALLIC MIXTURES BASED ON URANIUM

[75] Inventors: Yves Bertaud, Voiron; Sylvie Bouvet, Vinay; Airy-Pierre Lamaze, Grenoble, all of France

[73] Assignee: Uranium Pechiney, Courbevoie, France

[21] Appl. No.: 79,287

[22] Filed: Jun. 21, 1993

[30] Foreign Application Priority Data

Jun. 29, 1992 [FR] France .................. 92 08333

[51] Int. Cl.$^5$ .............................. C25C 1/22
[52] U.S. Cl. ............................ 204/1.5; 423/3; 423/258; 423/259
[58] Field of Search ................ 204/1.5; 423/3, 258, 423/259

[56] References Cited

U.S. PATENT DOCUMENTS

| | | | |
|---|---|---|---|
| H659 | 8/1989 | Haas | 204/1.5 |
| 3,330,742 | 7/1967 | Piper | 204/1.5 |
| 3,373,000 | 3/1968 | Pitts et al. | 423/258 |
| 3,518,062 | 6/1970 | Delange et al. | 422/159 |
| 3,720,748 | 3/1973 | Massonne | 423/4 |
| 4,021,313 | 5/1977 | Hausberger et al. | 204/15 |
| 4,202,861 | 5/1980 | Bourgeois et al. | 423/19 |
| 4,693,795 | 9/1987 | Eccles et al. | 204/94 |
| 4,704,261 | 11/1987 | Petit | 423/258 |
| 4,783,322 | 11/1988 | Eller et al. | 423/19 |
| 4,995,948 | 2/1991 | Doa et al. | 204/1.5 |

*Primary Examiner*—Donald P. Walsh
*Assistant Examiner*—Ngoclan T. Mai
*Attorney, Agent, or Firm*—Dennison, Meserole, Pollack & Scheiner

[57] ABSTRACT

A process for the selective electrofluorination of metallic alloy based on U characterized by effecting a selective anodic reaction on at least one of the components of the alloy by means of a controlled anodic voltage applied to the alloy in a bath of molten fluorides.

13 Claims, 1 Drawing Sheet

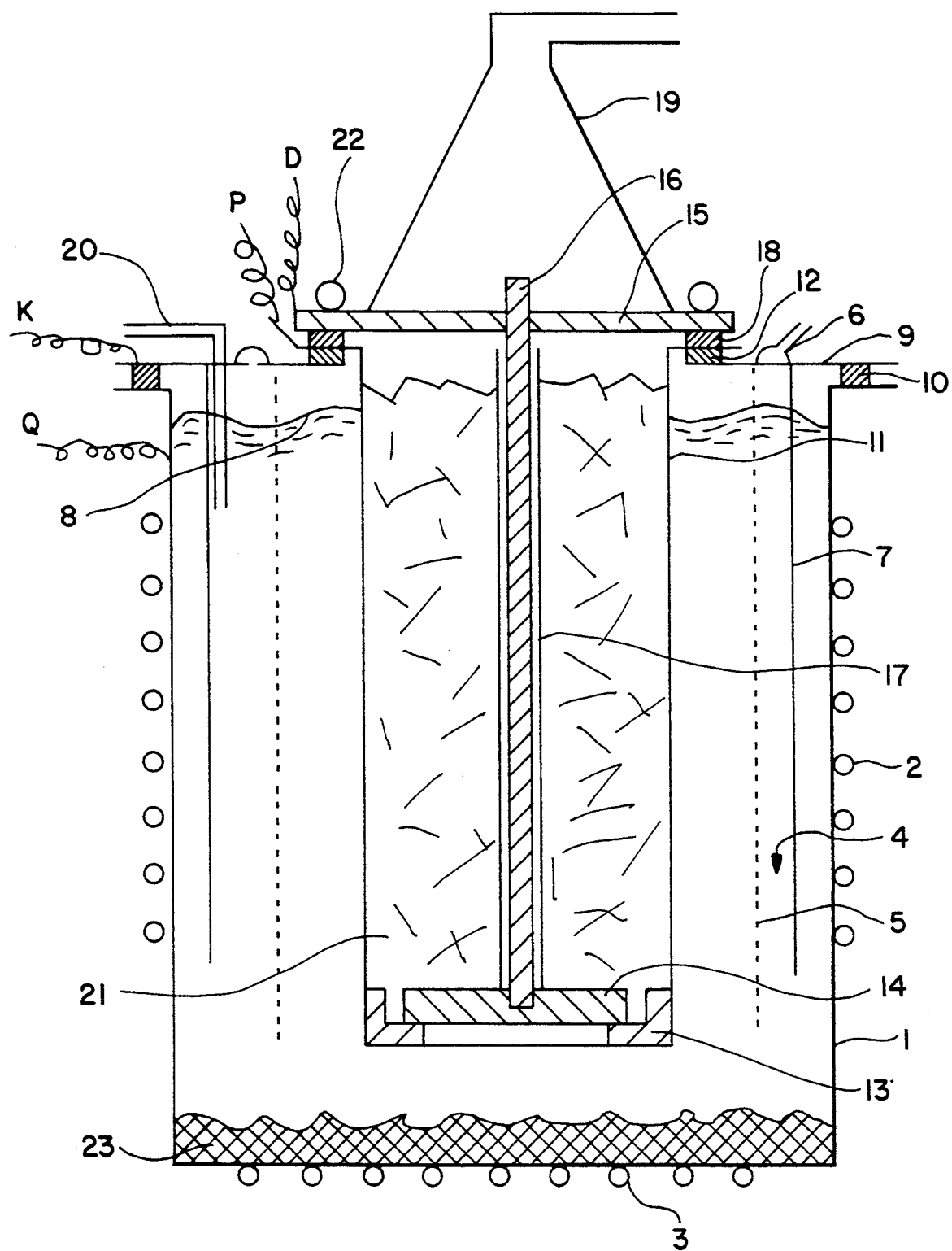

PROCESS FOR THE SELECTIVE ELECTROFLUORINATION OF ALLOYS OR METALLIC MIXTURES BASED ON URANIUM

FIELD OF THE INVENTION

The present invention concerns a process for the selective electrofluorination of alloys or metallic mixtures containing uranium in such a way as to be able to recover directly and separately the different components in the form of fluoride and in particular uranium in the form of gaseous hexafluoride.

DESCRIPTION OF RELATED ART

It is an attractive proposition to be able to separate the different components of waste, alloys or metallic mixtures based on uranium, in particular in order to be able to recover the uranium contained therein and its potential content of U235 in the purest possible form.

Hereinafter the term "alloy" will include all metallic mixtures in any form whatever.

For that purpose the applicants have already developed, in patent application FR 92-01730, a process for the fluorination of U-based alloy by reaction of fluorine and/or hydrofluoric acid to obtain "in fine" a mixture of gaseous fluorides containing in particular $UF_6$ which it is necessary to distil in order to separate the different components and obtain pure $UF_6$, whose potential in respect of U235 can thus be re-used in nuclear reactors.

Although that process makes it possible to recover pure uranium under very good conditions, transportation and handling of the gaseous fluorine does however involve risks which it is desirable to be able to avoid. Moreover the distillation of substantial amounts of gaseous fluorides can require installations and delicate management of the operations involved when the proportion of alloyed elements other than uranium is substantial.

That is why the applicants sought to develop a process for the selective fluorination of the various components of the alloy, which makes it possible to avoid handling of gaseous fluorine and to simplify the distillation operations, by limiting the volumes to be treated, which are intended to give the pure components, or even to eliminate such operations.

SUMMARY OF THE INVENTION

The invention is a process for the selective fluorination of alloy or metallic mixture based on uranium characterized by effecting a selective anodic reaction on at least one of the components of the alloy by means of a controlled anodic voltage applied to the alloy in a bath of molten fluorides.

Thus, this involves an anodic oxyfluorination reaction which essentially consists of anodically and selectively fluorinating the components of the alloy, beginning with that which is most electropositive. This process is particularly suitable for the recovery of uranium from alloys, by virtue of the fact that it is generally the most electropositive metal in the alloy; thus, the uranium is generally recovered first in the form $UF_6$, and the other metals can then be fluorinated separately one after the other in order to be recovered in accordance with the process of the invention or they may be discharged if recovery thereof does not involve any attraction.

In order to perfect the degree of purity of the $UF_6$ obtained or the other components of the alloy giving volatile fluorides, it is possible to effect complementary distillation of the anodic gases and/or the electrolysis bath.

The alloy to which the anodic voltage is applied is generally employed in fragmented form and for that reason it is preferable for it to be contained in a basket formed by a material which is resistant to the fluorine-bearing bath under the conditions in respect of voltage of the anodic reaction, it can be in particular based on carbon or Monel metal or certain insulating plastics materials such as polyfluoroethylenes (Teflon) or other perfluorinated plastics materials. The carbon or the carbon fibres which are reinforced by composites which can be rapidly passivated in the presence of fluorine and uranium salts constitute advantageous materials.

In order better to control the reaction, it is advantageous for the basket to be slightly cathodically polarised with respect to the alloy to be treated but of course always being anodically polarised with respect to the cathode; for that purpose, use is made of a metal basket (for example of Monel metal) which is internally covered with plastics material in order to insulate it from the alloy and to be able to maintain its potential at the selected value.

The electrolyte is exclusively based on molten fluorides; it is preferable for the cations to be such that, after reduction of said fluorides, they result in an element which is insoluble or weakly soluble in the bath or which does not react with same or with the anodic compounds obtained.

In that respect it is advantageous that, as fluoride, the electrolyte contains hydrofluoric acid as a regularly added consumable material; its cation, once reduced, does not react with the bath. Thus it is possible to use baths of the type KF-HF containing for example 38 to 45% (by weight) of HF which melts at between 80° and 120° C. such as the bath KF-2HF which melts at about 100° C., or baths of the type $NH_4F$-HF containing for example from 45 to 75% (by weight) of HF which melts at between 55 and 80° C., such as the bath $NH_4F$-3HF which melts at about 60° C. In that case hydrogen is generated at the cathode and is removed.

The temperature of the electrolysis bath is such that the metallic fluorides generated (including at least $UF_6$) are gaseous and can be easily recovered.

Likewise it is advantageous for the vapour pressure of the electrolyte to be sufficiently low to avoid pollution of the metallic fluoride collected.

The charge of alloy to be treated is set to an anodic potential such that all of the most electropositive metal of the alloy, generally uranium, as already stated above, is firstly fluorinated. The value of that anodic voltage may be within wide limits: it depends not only on the metal to be fluorinated but also the electrolysis bath, the current supply means, the constitution of the charge, the basket, the diaphragms and more generally the whole of the electrolysis equipment used.

The attempt is made to maintain that voltage approximately constant although it is in general necessary to adjust it to take account of the chemical or other variations which occur in the course of reaction in the electrolysis cell and to maintain an adequate production of gaseous fluoride; however, in order to preserve the selectivity of the process, it is then necessary to ensure that it is not at a level such that fluorination of another component of the alloy takes place.

After a first metallic component of the alloy has been completely fluorinated, the anodic voltage can be increased in such a way as to cause selective fluorination of a second component of the alloy, and so forth, in successive stages. It is also possible however to remove the residual metals if there is no interest in treating them by means of this method or if they give non-volatile fluorides.

It is difficult to determine the density of the anodic surface current used in the course of the process, having regard to the fact that the alloy is in fragmented form. However the applicants have found that it was preferable to operate with a low level of intensity so as to improve the degree of selectivity of the fluorination effect and that the critical parameter was the density of energy dissipated with respect to the volume of the electrolysis bath.

Thus it is possible to use densities of between 1 and 30 A/l of electrolyte, with cathodic densities of from 0.1 to 0.5 A/cm$^2$, the local anodic surface densities then being of the order of from 0.001 to 0.01 A/cm$^2$, depending on the state of division of the alloy.

In order to feed the anodic current to the metallic charge to be treated, the procedure generally involves using materials which are not consumed or which are consumed only slightly under the conditions of the process and which do not give fluorides which are volatile and/or which are easily passivated. Thus the applicants found that carbon is a choice material as it is automatically passivated in the regions which are remote from the metallic charge, with the probable formation of nascent fluorine.

As regards the cathode, it is generally metallic and formed of steel, nickel or Monel metal and separated from the anodic zone by a diaphragm, for example of the slatted shutter type, which prevents migration of the cation which is reduced in the anodic compartment.

The cathode can also be formed by all or part of the walls of the electrolysis tank; in that case, to prevent hydrogen from being given off on the bottom which is difficult to channel away, it is advantageous to insulate said bottom by a special non-conducting coating or by solidified electrolysis bath.

The tank is generally formed by a cylindrical or parallelepipedic casing, at the centre of which is disposed the anodic compartment with the basket containing the alloy to be treated. It is surmounted by an anodic dome which makes it possible to collect the volatile fluorides generated and possibly cathodic gas collectors for the recovery of hydrogen.

The tank can be insulating or may conduct current and may be for example of coated steel, Monel metal, nickel or plastics material which is resistant to the bath and to the temperature involved and which is preferably reinforced, etc... It is usually closed by a cover supporting the anodic basket with its current feed means and the dome for collecting the gaseous fluorides, the feed of fluoride (for example HF), the electrical connections and possibly the diaphragm, the cathodes and the hydrogen collector. It generally comprises a device (for example a coil) serving for cooling or heating the electrolytic bath with a view to melting it and/or holding it at a temperature.

BRIEF DESCRIPTION OF THE DRAWING

FIG. 1 shows an example of the arrangement of an electrolysis cell which is suited to the process according to the invention using a bath containing HF.

DESCRIPTION OF THE PREFERRED EMBODIMENT

Reference numeral 1 denotes the tank, for example of Monel metal or of steel, internally covered with an inert coating which is resistant to the bath and to the temperature involved, to the walls and the bottom of which are respectively fixed the coils 2 and 3 (or any other equivalent heating or cooling device) which permit regulation of the temperature of the bath or reheating thereof for example after a cooling phase which has resulted in solidification of the bath. In the present case the coil 3 also serves to produce a layer of solidified bath 23 for insulating the bottom.

The cathodic compartment 4 is separated from the rest of the cell (anodic compartment) by means of the diaphragm 5 which is here fixed to the cover 9 and which comprises inclined holes permitting confinement of the hydrogen formed, which is then removed by means of the collector 6. It comprises cathodic plates 7, for example of Monel metal, which are fixed to the cover 9 and which dip into the electrolysis bath, the surface of which is indicated at 8.

An HF feed conduit 20 passes through the cover. The cover is insulated from the bottom of the tank by a Teflon ring 10. The apertured anodic basket 11 which contains the anodic charge 21 is fixed to the cover 9 by way of the Teflon ring 12. It may be of a carbon composite but equally it may also be of Monel metal which is internally covered with a plastics insulating material, Teflon, fluorinated plastics material ... Disposed at the bottom of the basket is a Teflon ring 13 on which rests a carbon disc 14 constituting the lower active part of the anodic current feed means.

The latter therefore comprises the lower disc 14 which is connected to an apertured upper disc 15 (for discharge of the gaseous fluoride produced) by way of a composite carbon rod 16 which is screwthreaded at its ends and protected from the electrolytic bath by an inert and insulating casing 17 for example of Teflon or perfluorinated plastics material ... That arrangement makes it possible to force the current to pass by way of the lower disc 14 so as to preferably to consume the alloy disposed at the bottom of the basket and to cause the gases to percolate through the charge, the feed of that zone with alloy to be consumed then occurring automatically under the effect of gravity.

The upper disc 15 rests on an insulating ring 18 of Teflon which insulates it from the anodic basket 11.

Reference numeral 19 shows the dome which covers the anodic basket and serves to collect the gaseous fluoride formed. It is directly fixed onto the upper disc 15 to ensure good electrical contact which is possibly cooled by the coil 22.

It will be seen moreover that the electrical connection D for supplying the anodic current is directly onto the dome 19 and that the connection K for the feed of cathodic current is directly onto the cover 9 in contact with the cathode 7. The connection P which is connected to the anodic basket serves if necessary to provide for pilot control of and/or to measure the voltage of the basket. Finally the current feed Q serves for pilot control of the potential of the tank 1 to avoid corrosion thereof.

Other arrangements of the cell may be adopted in particular with other types of current feed, for example by means of the walls or the bottom of the tank.

EXAMPLES

The following Examples illustrate the invention.

Example 1

This Example involves effecting fluorination of an alloy U containing 10% of Mo.

The procedure involves using an apparatus corresponding to that shown in FIG. 1. The bath is a mixture of KF, 2HF which is maintained at 100° C., the tank 1 being of steel which is internally covered with a casing of Monel metal. The cathodic plates 7 are of Monel metal and the insulating diaphragm 5 is of Teflon (cloths under the mark GORE-TEX) which is perforated with inclined holes. The anodic basket 11 is of the composite material "Aerolor" (registered trademark of Le Carbone Lorraine), based on bidimensional carbon fibres, and being perforated, and contains pieces of alloy weighing about 50 g.

The anodic current feed comprises a lower disc 14 and a connecting rod 16 of graphite while the apertured upper disc 15 of the waggon wheel type is of carbonaceous composite material "Aerolor". The insulating sheath 17 around the rod 16 is of Teflon. The dome 19 is of Monel metal.

The tank and the cathodic plates have been connected together to be at the same potential and the terminal P of the anodic basket was left free to make measurements.

The bath was then melted by circulating through the coils a water-glycol mixture at 120° C., and then cold air was injected into the coil 3 at the bottom of the tank to produce a bottom which is covered with a layer of solidified bath.

A voltage was then applied between the cathodic terminal K and the anodic terminal D, taking into account the selective dissolution voltage of uranium, over-voltages and ohmic losses of the apparatus, in such a way as to give a level of intensity of about 50 A and to have a voltage of 1 V between P and K (anodic basket and cathode), which makes it possible better to control the selective dissolution reaction. The current density is then approximately 0.25 A/cm$^2$ at the cathodes and is estimated at approximately 0.01 A/cm$^2$ at the pieces of alloy.

That voltage is maintained approximately constant while however compensating for the Ohmic losses which occur; likewise a regular supply of HF is provided so that the HF content in the bath is constant.

The gases collected were continuously analysed by mass spectrometry; it was found that they were essentially formed by UF$_6$ with entrained amounts of HF and MoF$_5$ not exceeding about 0.05%. When the level of intensity fell significantly, it was not possible to increase the voltage to maintain said intensity at an acceptable level without abruptly increasing the proportion of MoF$_5$ in the gases collected.

That shows that all the uranium was dissolved. The anodic basket (terminal P) was then set to the anodic potential of the terminal D for fluorination of the residues of tetrafluoride UF$_4$.

After the electrolysis operation has been stopped, the anodic basket was withdrawn and the residual waste contained therein was neutralised; analysis thereof shows that it then contains practically only molybdenum (proportion of U, 0.01%).

Example 2

This Example involved effecting selective fluorination of a mixture of pieces of U and alloyed steel waste.

The tank 1 of steel used was internally covered with fluorinated polypropylene; it was heated and its temperature was regulated at 60° C. by means of hot air; the bath is formed by a mixture NH$_4$F-3HF. The cathodic plates 7 are strips of steel and the anodic basket 11 is also of fluorinated polypropylene; it also acts as a diaphragm to separate the anodic and cathodic compartments, by virtue of inclined holes provided in its wall.

The current feed is such as that described in FIG. 1, the insulating sheath 17 also being of fluorinated polypropylene. The dome 19 is of nickel.

The selective dissolution procedure was carried out in a similar fashion to that described in Example 1.

Bearing in mind that the anodic basket is not conductive, which means it is not possible to control the reaction by way of the potential of the basket, the level of intensity was limited to 20 A; as before the gases collected were continuously analysed.

A UF$_6$ titrating more than 99.8% was obtained. Its purity could be improved either by stopping the dissolution procedure earlier or by distilling the gas obtained, as already stated.

After electrolysis the metallic residues contained in the anodic basket were treated as in Example 1; they titrate 0.03% of U.

It will be seen that the invention makes it possible to recover practically all of the U from an alloy in such a form that it can be directly used in order to be possibly and easily adjusted, for example by gaseous in-line dilution, to a desired isotopic content, and for the production of nuclear fuels, it being known that, prior to its nuclear use, the uranium recovered can be completely purified by a distillation operation which is easy to carry out. It will also be seen that the process does not give rise to parasitic effluents, and it does not consume reactant and/or energy to react with elements other than the metal to be recovered or reactant for neutralising undesirable effluents.

What is claimed is:

1. A process for the selective electrofluorination of an alloy or a metallic mixture based on uranium comprising effecting a selective anodic reaction on at least one of the components of the alloy by means of a controlled anodic voltage applied to the alloy in a bath of molten fluorides.

2. A process according to claim 1 wherein the selective fluorination operation is applied to uranium.

3. A process according to either one of claims 1 and 2 wherein the alloy is used in fragmented form.

4. A process according to claim 1 or 2, wherein the bath of molten fluoride contains hydrofluoric acid.

5. A process according to claim 4 wherein the bath comprises KF-2HF or NH$_4$F-3HF.

6. A process according to claim 1 carried out in an electrolysis cell comprising a tank (1) provided with a device (2) permitting heating or cooling so that the bath can be melted, solidified and/or held at a temperature, a metallic cathode (7), an anodic basket (11) containing the charge of alloy to be treated (21) and an anodic current feed (14) to the charge, a diaphragm (5) separating the anodic and cathodic compartments, a dome (19) for recovery of the volatile fluorides produced in the course of the selective fluorination operation, and possibly a hydrogen collector (6).

7. A process according to claim 6 wherein the tank serves as a cathode.

8. A process according to either one of claims 6 and 7 wherein the anodic basket serves as a diaphragm.

9. A process according to claim 6 or 7, wherein the anodic current feed feeds said current to the bottom of the charge.

10. A process according to claim 6 or 7 wherein the tank comprises a cover (9) supporting the anodic basket (11), the recovery dome (19), possibly the cathode (7) and the hydrogen collector (6).

11. A process according to claim 6 or 7, wherein the tank is of coated steel, Monel metal, nickel or plastics material which is preferably reinforced.

12. A process according to claim 6 or 7, wherein the anodic basket is of Monel metal internally covered with plastics material, carbon, carbon fibres which are preferably reinforced, or plastics material, preferably polyfluoroethylene, or perfluorinated plastics materials.

13. A process according to claim 6 or 7, wherein the potentials of the alloy, the anodic basket and the tank are pilot-controlled separately and that preferably the anodic basket is cathodically polarised with respect to the alloy and that it is of metal which is internally covered with plastics material.

* * * * *